(12) United States Patent
Setsumasa et al.

(10) Patent No.: US 6,213,878 B1
(45) Date of Patent: Apr. 10, 2001

(54) IMAGE PROCESSOR, IMAGE PROCESSING METHOD AND GAME MACHINE AND RECORDING MEDIUM

(75) Inventors: Akio Setsumasa; Akira Nishino; Yusuke Yoshida; Takeshi Tanaka, all of Tokyo (JP)

(73) Assignee: Kabushiki Kaisha Sega Enterprises, Tokyo (JP)

(*) Notice: Subject to any disclaimer, the term of this patent is extended or adjusted under 35 U.S.C. 154(b) by 0 days.

(21) Appl. No.: 09/011,258
(22) PCT Filed: Jun. 3, 1997
(86) PCT No.: PCT/JP97/01883
  § 371 Date: Jan. 30, 1998
  § 102(e) Date: Jan. 30, 1998
(87) PCT Pub. No.: WO97/46294
  PCT Pub. Date: Dec. 11, 1997

(30) Foreign Application Priority Data

Jun. 3, 1996 (JP) .................................... 8-140170

(51) Int. Cl.$^7$ .................................... A63B 15/00
(52) U.S. Cl. .................................... 463/31; 463/1; 382/359; 345/429
(58) Field of Search ................ 463/30–32; 345/112, 345/145, 146, 156, 157, 160, 161, 162, 427; 382/307, 308

(56) References Cited

U.S. PATENT DOCUMENTS 4,752,069  6/1988  Okada ............... 273/1 GC

FOREIGN PATENT DOCUMENTS

| 0 700 010 A2 | 3/1996 | (EP) . |
| 0 713 174 A1 | 5/1996 | (EP) . |
| 3-80786 | 8/1991 | (JP) . |
| 4-253885 | 9/1992 | (JP) . |

OTHER PUBLICATIONS

The 3DO Company Soccer Kid Brochure pp. 1–13, 1994.*
The 3DO Company Immercenary Brochure pp. 1–23, 1993.*
Final Fantasy VI The Complete, NTT Publishing, Inc., published Sep. 19, 1994.
PlayStation Bio Hazard V Jump Books Games Series, SYUEISYA, Inc., published May 7, 1996.

* cited by examiner

*Primary Examiner*—Valencia Martin-Wallace
*Assistant Examiner*—Sheila Clayton
(74) *Attorney, Agent, or Firm*—Finnegan, Henderson, Farabow, Garrett & Dunner, L.L.P.

(57) ABSTRACT

Although difficult game stages may not be cleared by unskilled players, by making the stages easy to be cleared, the degree of difficulty of the game would be lowered and the amusement of the game would be reduced.

The present invention comprises: a storing device 102 capable of storing the number of certain marks displayed in an virtual space and which are in the player's hand, as well as displaying the position of such marks; a processing circuit 10 for advancing the respective steps of game control in sequence by referring to the operation signals supplied from an input device 2b, the number of marks in hand and positions thereof stored in the storing device, and for outputting displaying image data related thereto; a displaying circuit 11 for displaying a displaying image including the segment and marks on the basis of displaying image data supplied from the processing circuit. The processing circuit 10 generates displaying image data displaying said marks in the displaying image according to the operation signals, and stores the displaying positions of the marks in the storing device 102, and generates-displaying image data for displaying the segment at the displaying positions stored in the storing device 102 when the segment is unable to continue moving.

9 Claims, 9 Drawing Sheets

IF THE CHARACTER DIES AFTER
PLACING THE FLAGS AS ABOVE:

FIG.7

RESTART IS MADE FROM
THE LAST FLAG PLACED.

FIG.8

CALCULATION OF THE FLAGS
IMPLEMENT AS OF THE GOAL.

FIG.9

UNUSED FLAGS ARE RETURNED AND
ADDED TO THE NUMBER OF FLAGS IN HAND.

FIRST STAGE (CLEARED AGAIN)
START — F2 — GOAL
THIS FLAG WILL BE COLLECTED IF THE STAGE IS CLEARED WITHOUT USING IT.

FIG.16

SECOND STAGE
START — F4 — F5 — F6 P — GOAL
COLLECTED FLAGS CAN BE REUSED.
(COMPLETELY DEARED BY COLLECTING ALL FLAGS IN THE MAP.)

IMAGE PROCESSOR, IMAGE PROCESSING METHOD AND GAME MACHINE AND RECORDING MEDIUM

FIELD OF THE INVENTION

The present invention relates to image processing device, an image processing method, a game device and a recording medium, more particularly to providing video games which may be easily used by players who cannot finish such games until the end.

BACKGROUND ART

Among video game devices for domestic and commercial uses, there are game devices which are structured of a plurality of game stages and which players successively complete (hereinafter referred to as "clear") the game stages and thereby compete for the scores. At each game stage, the players operate input devices such as joysticks and joypads (trademark) etc., and moves a certain segment (hereinafter referred to as the "character", meaning a segment operated by the player and expressed with outward appearances of human being etc.) which is displayed in the displaying image in the direction operated by the player.

For example, SEGASONIC THE HEDGEHOG (manufactured by SEGA ENTERPRISES, LTD.) is made so that the character in the displayed screen will move as it avoids obstacles, and the players compete for the degree of progress of the character, whereby high scores may be obtained.

In each game stage, the obstacles displayed in the display stage attack and interfere with the character operated by the player. If the character receives any attack or interference from the obstacles, the character is damaged, and if damaged a certain number of times, the game will be over leaving that game stage uncompleted. If the character is damaged, the progress of the game is returned to the starting position of the first stage or returned to the starting point of the currently challenging stage as a penalty imposed on the player. Accordingly, so long as the character is set to be returned to the starting position, the player can never proceed to the next stage unless he is substantially proficient in the operation of the game.

Therefore, conventionally, game devices were devised to control the game so as to be returned only mid way even if the character is damaged.

However, if the character's returning positions are set only in the memory, the player may not confirm those returning positions with his own eyes. Moreover, the amusement of the game will be limited if the frequency of the allowed return is unchanged.

Among other conventional game devices were those adopting an idea of specific predetermined points ("continuing points"), that is, by passing the continuing points a character is allowed, to restart from the points even if the character is damaged.

However, even such games were not easy to use for all of the players because it is meaningless if the character is unable to reach the continuing points.

In other words, if a player can not store the progress of the game when the player determines he is unable to overcome the game stage, the player will be obliged to restart from the beginning again and again.

On the other hand, there were games which allowed players to store the progress of the game at any point during the game. Nonetheless, such function, on the contrary, easily lowered the degree of difficulty of the game operation and deprived the amusement of the game itself. For, in the most extreme case, by repeating storage of the game process upon every step forward, the game will proceed little by little even if the player does not have a high operating technique.

As described above, conventional game devices were inconvenient in that the players insufficiently skilled in the operation could not advance the game over a certain degree, or, on the contrary, by excessively lowering the difficulty of the game, the amusement of the game was reduced.

Furthermore, there was a further inconvenience that, by limiting the frequency of the allowed restart, the progress of the game would become rigid and the amusement of the game would be limited.

DISCLOSURE OF THE INVENTION

The present invention has been devised for solving the problems mentioned above. By improving the operational performance without reducing the degree of difficulty of the game, the present invention aims at providing image processing technology enjoyable for insufficiently skilled players.

In other words, the first purpose of the present invention is to set a returning position along the progress of the game for uncompleted games and display such position so that players insufficiently skilled in the operation may concentrate on the operation of the game without being bored.

The second purpose of the present invention is to avoid lowering the degree of difficulty of the game in excess by providing limitation to the settable returning positions, and thereby adjusting the degree of difficulty of the game according to each player.

The third purpose of the present invention is to alter the difficulty of the game operation by changing the settable returning positions, and thereby increasing the amusement of the game operation. The image processing device of claim 1 is for accomplishing the first purpose, and comprises:

an image processing means for generating a displaying image including a segment and for advancing respective steps of game control in sequence;

a movement control means for moving displaying positions of said segment;

a mark displaying means for displaying specific marks in said displaying image during the progress of a game; and a storing means for storing displaying positions of the displayed marks, wherein, when said segment is unable to continue moving, said movement controlling means causes said segment to move to the displaying positions of said marks and restart the movement from such displaying positions.

The image processing device of claim 2 according to claim 1 is for accomplishing the first purpose and has said mark displaying means displays in the displaying image said marks at said displaying positions instructed from the outside.

The image processing device of claim 3 according to claim 1 is for accomplishing the second purpose and has said mark displaying means displays said marks within the limit of a predetermined number of the marks in hand.

The image processing device of claim 4 according to claim 1 is for accomplishing the third purpose has said mark displaying means eliminates displayed marks already set by the instruction of the player, and displays the eliminated marks at different displaying positions.

The image processing device of claim 5 according to claim 1 is for accomplishing the first purpose and the game is structured of a plurality of stages, said mark displaying means displays said marks for each of the plurality of stages, and said movement controlling means displays said segment at the displaying positions of said respective marks and thereafter restarts movements of said segment when said segment is unable to continue moving for each of said plurality of stages.

The image processing device of claim 6 according to claim 5 is for accomplishing the third purpose and has said mark displaying means renews the number of said marks in hand allotted to each stage if the progress of said stage is compeleted.

The image processing device of claim 7 according to claim 5 is for accomplishing the third purpose and comprises a mark adding means for adding a predetermined number of marks to the number of said marks in hand and for storing added marks in said storing means when the new stage is commenced.

The image processing device of claim 8 according to claim 5 is for accomplishing the first purpose and comprises a mark calculating means for implementing calculating processing, as of the end of the progress of said stage, on the basis of the number of marks in hand displayed in said stage and for storing the calculated number of marks in hand into said storing means.

The image processing device of claim 9 according to claim 8 is for accomplishing the first purpose and has said mark calculating means adds the number of said marks displayed in said stage excluding the marks used by said movement controlling means for restarting the movement of said segment to the number of marks in hand.

The game device of claim 10 having the image processing device according to any one of claims 1 through 9 is for accomplishing the first purpose and said displaying image is a certain map and said segment is a game segment heading for its destination while avoiding obstacles by the operation of the player.

The game device of claim 11 is for accomplishing the first purpose and is for advancing the respective steps of the game control in sequence by moving the segment operated by the player within a displayed virtual space comprises:

an input device for outputting operation signals by the operation of the player;

a storing device capable of storing the number of specific marks in hand as well as the displaying positions thereof displayed in the virtual space;

a processing circuit for advancing said respective steps of game control in sequence by referring to the operation signals supplied from said input device, number of marks in hand and the displaying positions thereof stored in said storing device and for outputting displaying image data related thereto; and a displaying circuit for displaying the displaying image including said segment and marks on the basis of displaying image data supplied from said processing circuit, wherein said processing circuit generates displaying image data displaying said marks in the displaying image in response to the operation signal supplied from said input device, and when the segment is unable to continue moving, generates displaying image data displaying said segment at the displaying positions of the marks stored in said storing device.

The game device of claim 12 is for accomplishing the first purpose and is for advancing the respective steps of a game control in sequence by moving a segment operated by a player within a displayed virtual space includes, in case said segment is unable to move, a restarting means for restarting the progress of said game control from the position where said segment became unable to move, comprising:

a position information storing means for storing displaying position information of said segment in said virtual space designated by the operation of the player; and a mark displaying means for displaying marks corresponding to the position information in said position information storing means, wherein upon restart of said progress of game control, a position to restart the progress of game control is determined on the basis of position information on said position information storing means.

The image processing device of claim 13 according to claim 12 is for accomplishing the third purpose and comprises:

eliminating means for eliminating position information in said position information storing means; and a display eliminating means for eliminating displayed marks corresponding to the position information eliminated by said eliminating means.

The invention of claim 14 is for accomplishing the first purpose and the machine-read recording medium records a program for causing a computer to execute:

a step of generating a displaying image including a segment and advancing respective steps of game control in sequence;

a step of moving the displaying position of said segment;

a step of displaying specific marks in the displaying image during the progress of game control;

a step of storing displaying positions where said marks were displayed; and a step of moving said segment to said displaying positions of the marks and restarting movement of said segment from such displaying position when said segment is unable to continue moving.

The recording medium according to the present invention records the order for causing the processing device to perform the method stated in any one of the paragraphs above. The recording medium includes, for example, floppy discs, magnetic tapes, optical magnetic discs, CD-ROMS, DVDs, ROM cartridges, RAM cartridges with battery backup, flash memory cartridges, non-volatile RAM cartridges, etc. The recording medium records information (mainly digital data, programs) by using some sort of physical method, and is capable of causing processing devices such as computers, exclusive processors, etc. to implement predetermined functions.

Furthermore, in the above-described recording medium are included wire communication media such as communication circuits etc., and radio communication media etc. such as microwave circuit and the like. Internet is also included in the communication media mentioned herein.

BEST MODE FOR CARRYING OUT THE INVENTION (Embodiment 1)

A preferred embodiment is explained below referring to FIGS. 1 through 9. Described in this embodiment is a case where the image processing device according to the present invention is applied to a TV game device.

(Structure)

Figure 1:
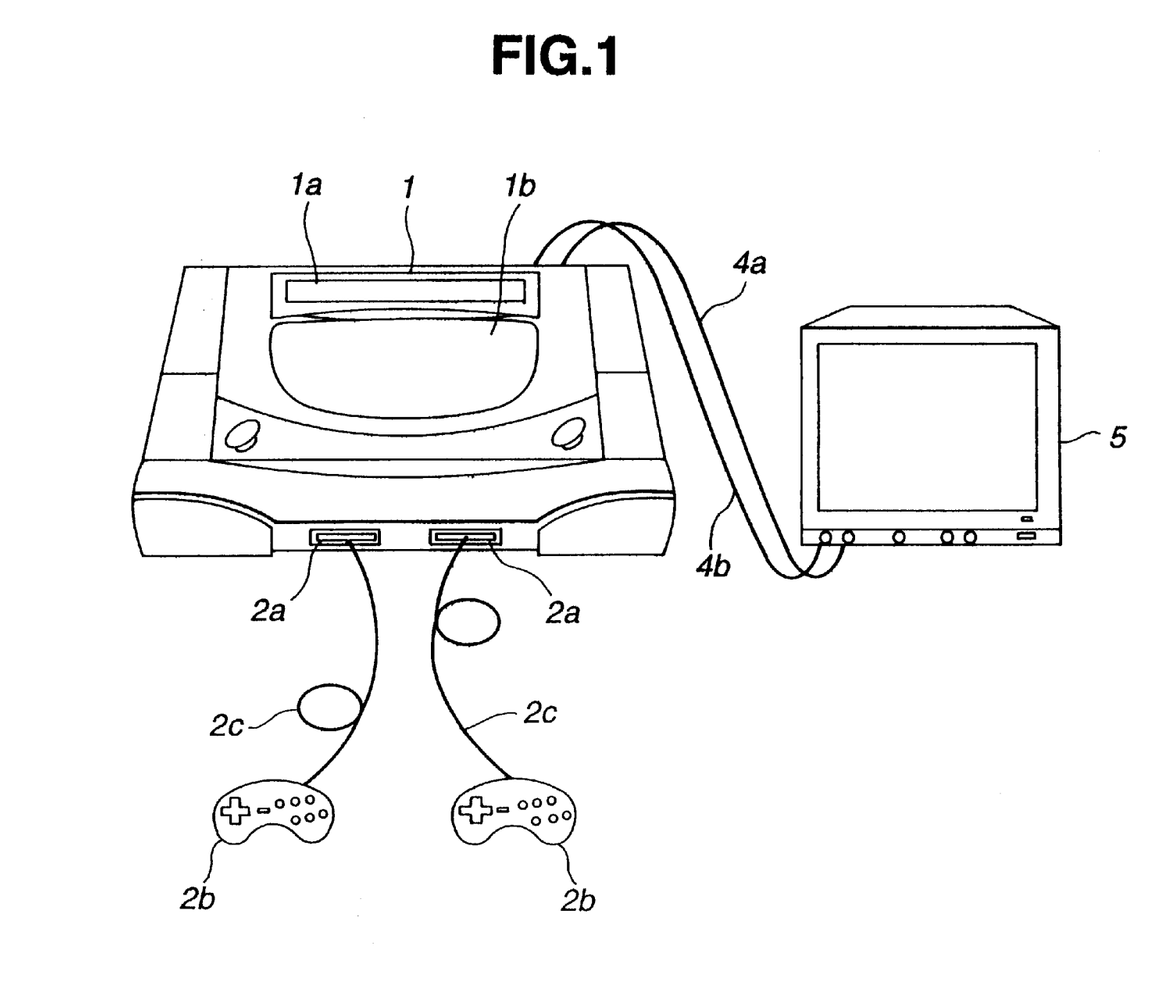
FIG. 1 is a general perspective view of a TV game device to which is applied an image processing device according to embodiment 1 of the present invention.

FIG. 1 shows an exterior view of the TV game device according to an embodiment of the present invention. In FIG. 1, two connectors 2a are provided on the front face of a TV game main unit 1. Connected respectively to the connectors 2a via cables 2c are peripheral devices 2b such as PADs for the operation of the game device. On the upper portion of the TV game main unit 1 are provided a cartridge interface (I/F) 1a for connecting ROM cartridges and a CD-ROM drive 1b for reading CD-ROMs. Although not shown in the figure, a video output terminal and an audio output terminal are provided on the back face of the TV game main unit 1. This video output terminal is connected to a video input terminal of the TV receiver 5 via a cable 4a, and the audio output terminal is connected to an audio input terminal of the TV receiver 5 via a cable 4b. In the above-described TV game device, by operating peripheral devices 2b, the player may play the game while watching the picture projected on the TV receiver 5.

Figure 2:
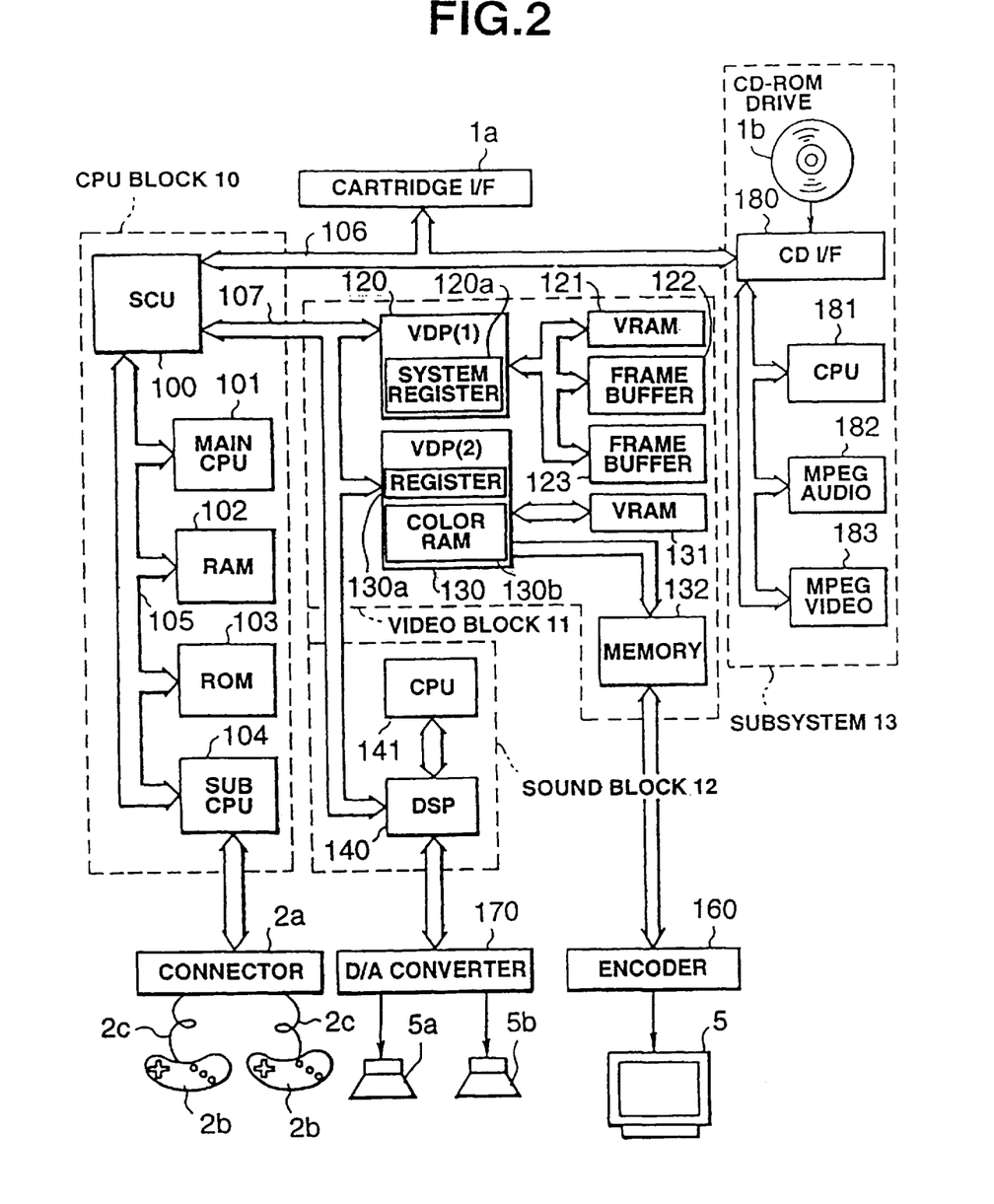
FIG. 2 is a block diagram of a TV game device to which is applied an image processing device according to embodiment 1 of the present invention.

FIG. 2 is a block diagram of the TV game. This TV game is structured of a CPU block 10 for controlling the entire device, a video block 11 for controlling the display of the game screen, a sound block 12 for generating sound effects etc., a subsystem 13 for reading CD-ROMs, etc.

The CPU block 10 includes an SCU (System Control Unit) 100, a main CPU 101, a RAM 102, a ROM 103, a cartridge I/F 1a, a sub CPU 104, a CPU bus 105, etc.

The main CPU 101 is structured so that it is able to control the entire device. Although not shown in the figure, the main CPU 101 internally includes a computing function similar to a DSP (Digital Signal Processor), and comprises a structure capable of executing application software at high speeds.

The RAM 102 is structured so that it can be used as a working area of the main CPU 101. In the ROM 103 are written initial programs etc. for initial processing to implement the initial start-up of the present device. The SCU 100 is structured so that it is able to input or output mutual data exchanged between the main CPU 101, VDPs 120 and 130, a DSP 140, a CPU 141, etc. by controlling the buses 105, 106 and 107.

The SCU 100 comprises a DMA controller inside and is structured so that it is capable of transferring image data of display elements (polygon data and the like) constituting segments of the game to a VRAM in the video block 11.

The cartridge I/F 1a is structured so that it is able to transfer to the CPU block the program data and image data from the recording medium supplied in a form of a ROM cartridge.

The sub CPU 104 is the so-called SMPC (System Manager & Peripheral Controller) and is structured so that it is capable of collecting operation data in response to the request of the main CPU 101 from the peripheral devices 2b via the connectors 2a shown in FIG. 1.

The main CPU 101 implements image controlling such as rotational conversion and perspective conversion and the like of the character in the game screen on the basis of the operation signals received from the sub CPU 104. The connectors 2a are structured so that they can be connected to desired peripheral devices such as PADs, joysticks, keyboards, etc. The sub CPU 104 comprises functions of automatically recognizing the type of peripheral devices connected to the connectors 2a (terminals on the body side) and collecting operation signals etc. in accordance with the communication mode of the type of the peripheral devices.

The video block 11 is structured to comprise a first VDP (Video Display Processor) 120, a second VDP 130, a VRAM (DRAM) 121, frame buffers 122 and 123, a VRAM 131 and a frame memory 132.

The first VDP 120 has a built-in system register 120a and is connected to the VRAM (DRAM) 121, the frame buffers 122 and 123, and is structured so that it is able to generate segments (characters) etc. formed by TV game polygons for TV game. The second VDP 130 comprises a register 130a and a color RAM 130b and is connected to the VRAM 131 and the frame memory 132, and is structured so that it is able to implement various processing such as drawing background images, synthesizing segment screen data and background image data according to priority (displaying priority), as well as the clipping processing, designation of displaying colors etc. The register 130a is structured so that it is able to contain displaying image controlling information. The color RAM 130b is structured so that it is able to store color data defining the displaying colors.

The VRAM 121 is structured so that it is able to contain polygon data showing TV game characters transferred from the main CPU 101 (a set of apex coordinates), as well as conversion matrix data for converting the field of view.

The frame buffers 122 and 123 are structured so that they are able to contain image data produced by the first VDP 120 in accordance with the polygon data etc. (e.g., data generated in 16 or 8 bits, in a form of pixel).

The VRAM 131 is structured so that it is able to contain background image data supplied from the main CPU 101 via the SCU 100.

The frame memory 132 is structured so that the second VDP 130 is able to contain the final displaying image which is generated by synthesizing background image data and image data provided with a text mapping, which is sent from the first VDP 120, by fixing priority (indicating priority) in accordance with the setting of the register 130*a*. If the displaying image data is in a pallet form, color data defined in the RAM 130*b* is read by the second VDP 130 in accordance with the value of the data, whereby the displaying color data is formed. Furthermore, if the displaying image data is in a RGB form, the displaying image data themselves become the indicating color data.

An encoder 160 generates image signals by adding synchronous signals etc. to the displaying image data above to be constructed so as to output to the TV receiver.

The sound block 12 comprises a DSP 140 for implementing sound synthesis in accordance with the PCM or FM methods, and a CPU 141 for controlling the DSP 140. The DSP 140 is structured so that it is capable of converting the sound signals into 2-channel signals by a D/A converter 170 and thereafter outputting the same to two speakers 5*a* and 5*b*.

The subsystem 13 is composed of a CD-ROM drive lb, a CD I/F 180, CPU 181 an MPEG AUDIO 182, an MPEG VIDEO 183, etc. The subsystem 13 comprises functions of reading the application software supplied in a form of a CD-ROM and regenerating a moving picture. The CD-ROM drive 1*b* reads data from the CD-ROM. The CPU 181 is structured so that it is able to implement controlling of the CD-ROM drive 1*b* and other processing such as correction of errors in the data being read. The data read from a CD-ROM is supplied to the main CPU 101 via the CD I/F 180, the bus 106 and the SCU 100, and will be used as application software. The MPEG AUDIO 182 and the MPEG VIDEO 183 are devices for restoring data compressed by MPEG (Motion Picture Expert Group) standards. The moving picture can be regenerated by restoring the MPEG-compressed data stored in the CD-ROM via the MPEG AUDIO 182 and the MPEG VIDEO 183.

Figure 3:
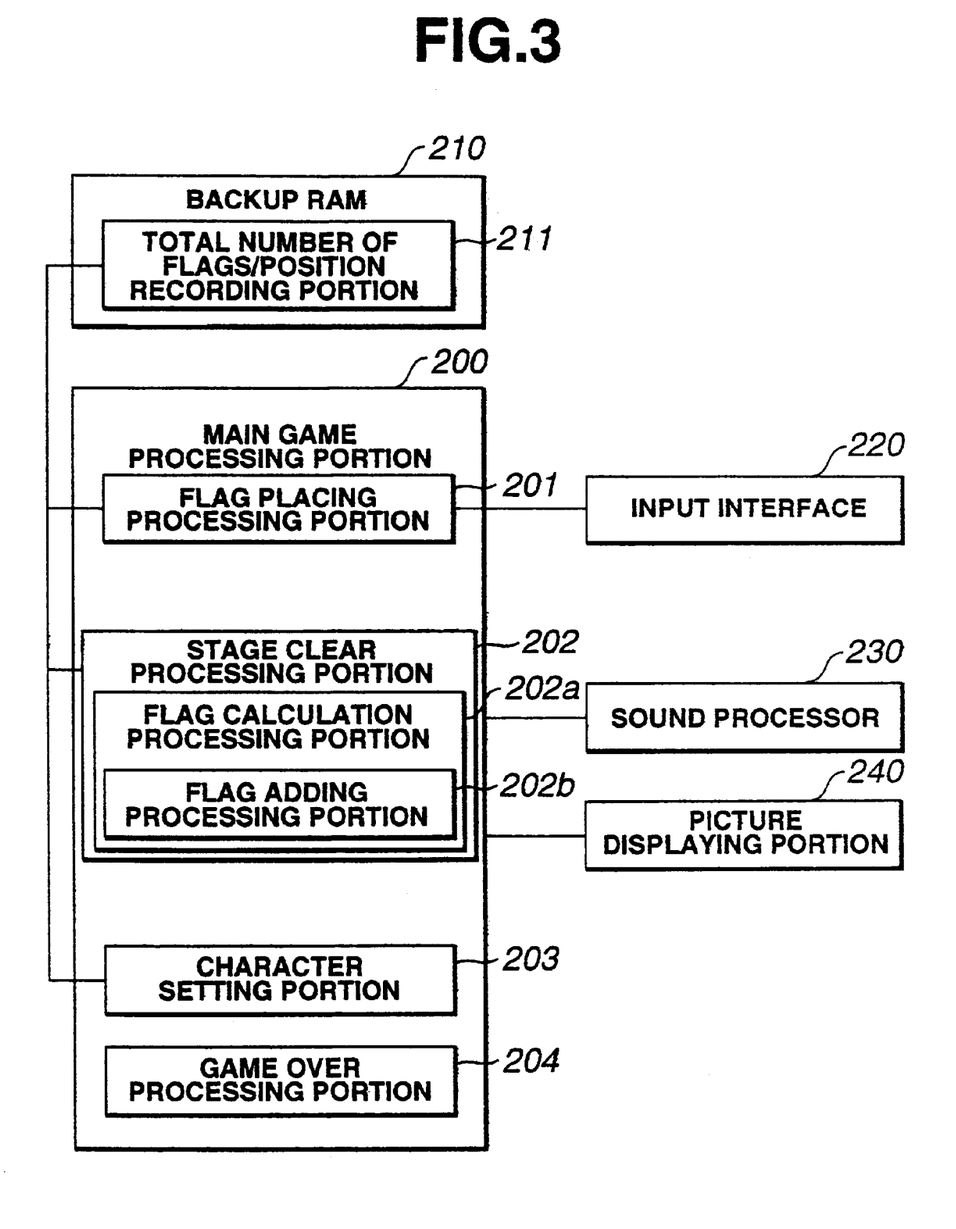
FIG. 3 is a block diagram showing functions of a TV game device to which is applied an image processing device according to embodiment 1 of the present invention.

FIG. 3 is a block diagram showing the function of the image processing device according to embodiment 1 of the present invention. As shown in this figure, the image processing device comprises a main game processing portion 200, a backup RAM 210, an input interface 220, a sound processor 230 and a picture displaying portion 240.

The main game processing portion 200 comprises a flag placing processing portion 201 for placing a mark (hereinafter referred to as the "flag"), a stage clear processing portion 202, a character setting portion 203 and a game over processing portion 204. The stage clear processing portion 202 comprises a flag calculation processing portion 202*a*, and the flag calculation processing portion comprises a flag adding processing portion 202*b*. The backup RAM 210 comprises a total flag number/position recording portion 211. The flag placing processing portion 201, the stage clear processing portion 202 and the character setting portion 203 are connected to the total flag number/position recording portion 211.

The flag placing processing portion 201 is structured so that, when flags are placed in the displaying image (i.e., when the picture of the flags are displayed), the position of such flags and the number of the displayed flags may be recorded in the backup RAM. The stage clear processing portion 202 implements calculation of the flags according to the number of flags in hand, the position of the flags being placed, and the number of the flags used, all of which are stored in the backup RAM, and adds the predetermined number of flags upon entering a new stage.

Furthermore, the main game processing portion 200 in FIG. 3 corresponds to the main CPU 101 (or the sub CPU 104) in FIG. 2. Similarly, the backup RAM 210 corresponds to the RAM 102 or an externally provided RAM which is not shown in FIG. 2. The input interface 220 corresponds to the cartridge I/F 1*a* and the CD I/F 180, the sound processor 230 corresponds to the sound block 12 and the picture displaying portion 240 corresponds to the video block 11.

(Actions)

Next, explanation is made regarding the actions.

Figure 4:
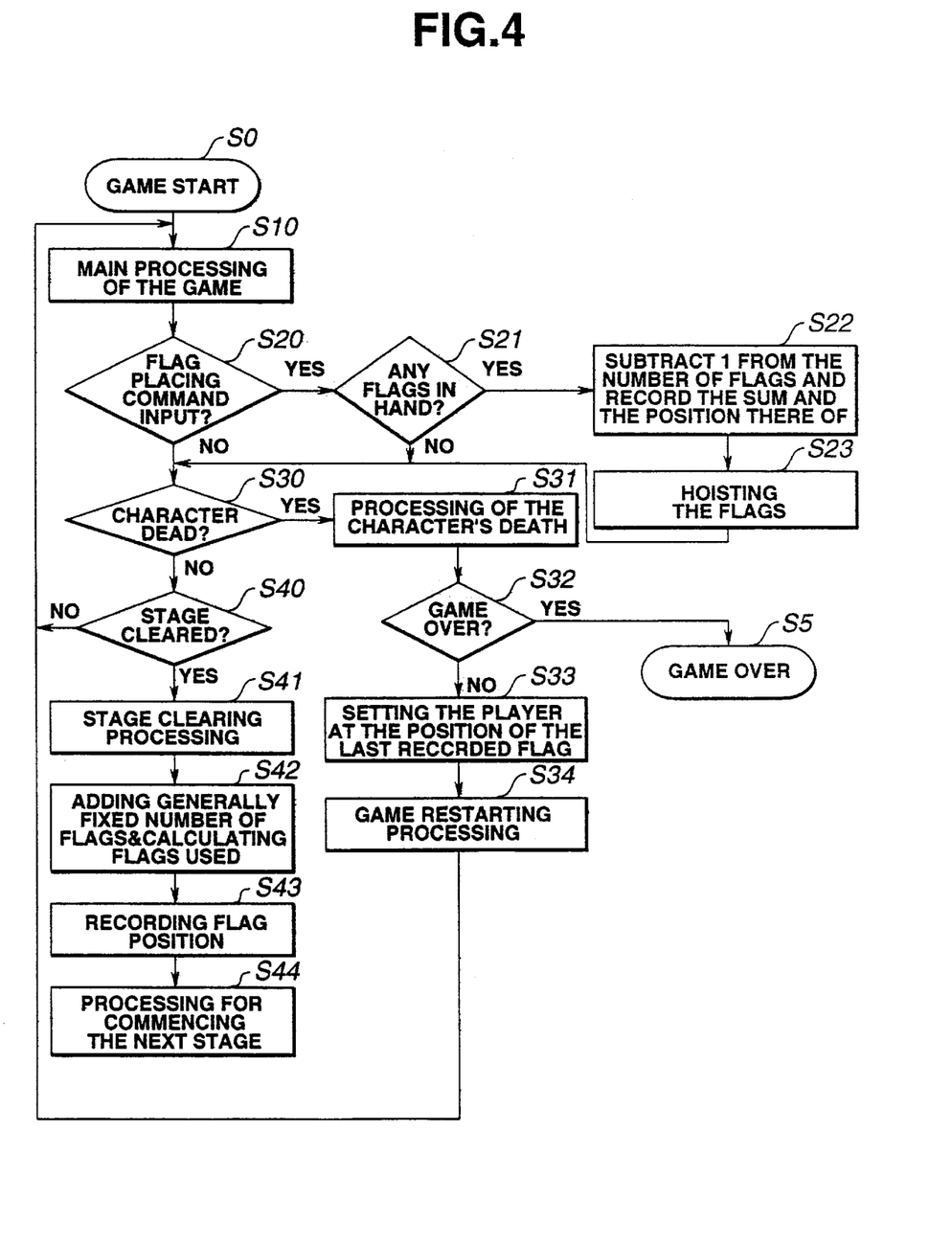
FIG. 4 is a flowchart showing image processing according to embodiment 1 of the present invention.

FIG. 4 is a flowchart showing the actions of the image processing device of this embodiment. In this chart, S10 is the main processing of the game. S20 through S23 are the processing upon placing a flag. S30 through S34 are the processing when the player is damaged and dead (a case where the game may not be continued in the same state). S40 through S44 are the processing when the stage is cleared.

First, explanation is made regarding the flags and the outline of processing of the flags. As mentioned above, a flag is a mark which is necessary for the player for storing the progress of the game (the current position etc.) in a map (a displaying image showing predetermined landscapes in an adventure game; different maps are displayed in each game stage). Consequently, an act of "placing a flag" means to display a picture of a flag, as well as to store the progress of the game as of the time. Flags are added in numbers predetermined for each map. The total number of those flags is the number of the flags in hand. Unused flags may be carried over to the next map. In addition to the adding amounts defined for each map, flags may be added during the progress of the game by picking up an item (a segment affecting the progress of the game and handled as "having been picked up" upon passing its displaying position). Moreover, upon success in the flag race below, flags used in the previous map can be recovered.

By selecting commands and operating buttons, flags may be placed at any time during progress of the game, at that position. Basically, flags once placed may not be extracted (to eliminate from the displaying image), with the exception of a success in the flag race described below.

As mentioned above, the purpose of the flags is to store the state in the maps, and if the character operated by the player is dead (i.e., a condition unable to continue playing the game because certain conditions were not satisfied), restarting from the last placed flag is permitted. If no flag has been placed, restart is to be made from the beginning of that map.

The number of flags in hand is increased and decreased by the adding processing and the calculating processing. First, a predetermined number of flags are added to the number as those in hand. This is the adding processing. On the other hand, if the stage is cleared, the positions of the flags and the number used will be stored. Among the flags added (or picked up) in the stage, the number of flags which remained unplaced will be added to the number of those in hand and the sum will be similarly recorded. If the flags were used more than the number added, the number of flags in hand is reduced and recorded.

Furthermore, any flags which were placed but not used (did not restart from that point) will be determined as not having placed, and they will disappear from the map and will be added to the number of the flags in hand. Even if the flags were repeatedly placed along the way, all the flags would be recovered and added to the number of flags in hand if the stage was cleared without using even one flag. This is the calculating processing. However, it should be noted that the number in hand is calculated only when the stage is cleared.

Next, the action of the present invention is explained in detail according to the flowchart of FIG. 4.

Step S10: Main Processing of the Game

Normal processing such as the operation of the character, and attacks from the obstacles etc. is implemented.

Step S20: Has the command for placing a flag been input or not?

The player may place a flag at his option if he has any flags in hand. In order to place a flag, a predetermined command is to be input. If such command is input (Y), processing S21 through S23 is implemented.

If not (N), the processing S30 is implemented.

Step S21: Are there any flags in hand?

If there is a flag in hand (Y), processing S22 is implemented. If not (N), processing S30 is implemented.

Step S22: Subtracting 1 from the number of flags in hand, and recording the positions of the flag.

In order to place the flag, the character's position at such time is recorded and the number of flags in hand is reduced by one. Then, processing S23 is implemented.

Step S23: Placing the flag

Flags are placed at the position recorded at step S22. The position of the flag and the latest number of flags in hand are recorded in the backup RAM 210. Processing S30 is implemented thereafter.

Step S30: Is the character dead?

Determination is made whether or not the character has been damaged by the attack of the obstacles in the map and whether or not the character is dead. If the character is dead (Y), processing S31 through S34 is implemented.

If not (N), processing S40 is implemented.

Step S31: Processing the Character's Death

A predetermined death processing is implemented when the chartacter is dead, and the progress of the game is temporarily ceased.

Step S32: Game over?

If the game may not be continued because the flags available to the player are insufficient, the game will be determined over (Y), and the processing proceeds to S5 and the game is ended.

If not determined over (N), processing S33 is implemented.

Step S33: Setting the player at the flag position last recorded.

If the game may be continued, the player is set at the flag position which was last recorded. The game may be restarted from this position.

Step S34: Processing for Restarting the Game

Procesing for restarting the game from the position of the player set at step 33 is implemented, and processing is thereafter returned to S10.

Figure 6:
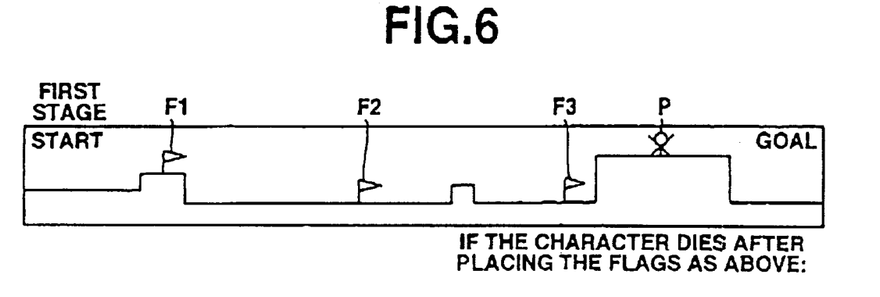
FIG. 6 is an example of a map screen for explaining the image processing actions according to embodiment 1 of the present invention.
Figure 7:
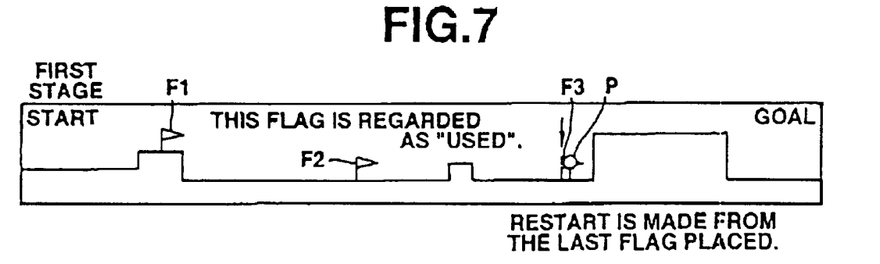
FIG. 7 is an example of a map screen for explaining the image processing actions according to embodiment 1 of the present invention.

Actions of steps S30 through S34 above are explained using the figures. For example, suppose that a player P was dead after placing three flags Fl through F3 in a map (first stage), as shown in FIG. 6. In this case, as shown in FIG. 7, the player P need not restart the game from the left edge of this map but may restart from the point of a flag F3 which was last placed. Even if the route up to the flags Fl and F2 was very difficult, such route need not be played again. Thus, by placing a flag, restart from the starting position will not be obligated, and the player's burden will be reduced.

Flags can be placed at arbitrary positions by the command of the player (S20 through 523). Therefore, flags may be freely placed depending on the technique and the desire of the player, whereby the interest of the game is increased. For example, if the player thinks that clearing of the stage would be easy for him, no flags need to be placed. If the player thinks that the clearing of the stage would be difficult, by placing many flags, he will be able to clear the stage at the end even if the character dies many times. However, since the number of flags is limited, if too many flags are placed at the beginning, no flags would be available at the later time desired. Taking this into account, the player needs to strategically place the flags. Thus, the technique of the players is challanged are competed and an amusing game is provided. If the positions of the flags are previously programmed and stabilized, such amusement would not be experienced.

Step S40: Has the stage been cleared?

If the character is not dead, determination is made as to whether or not the stage has been cleared. If the stage has been cleared (Y), processing S41 through S44 is implemented.

If not (N), processing is returned to S10.

Step S41: Stage Clearing Processing

If the character safely reaches the goal of that map, the clearing processing is implemented for that stage.

Step S42: a fixed number of flags are added, and the flags used are calculated.

Figure 8:
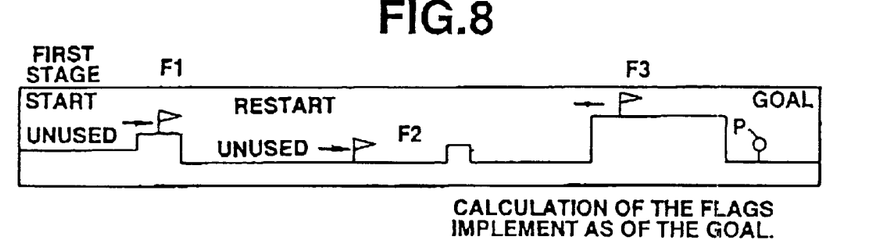
FIG. 8 is an example of a map screen for explaining the image processing actions according to embodiment 1 of the present invention.
Figure 9:
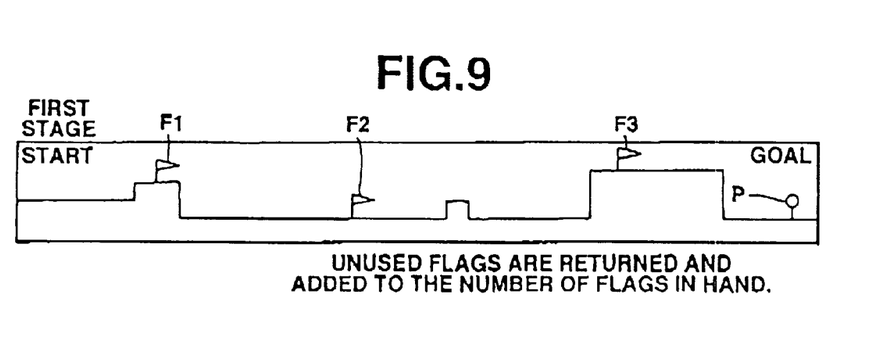
FIG. 9 is an example of a map screen for explaining the image processing actions according to embodiment 1 of the present invention.

Since this processing is the distinctive part of embodiment 1, detailed explanation will be given according to FIGS. 5, 8 and 9.

Figure 5:
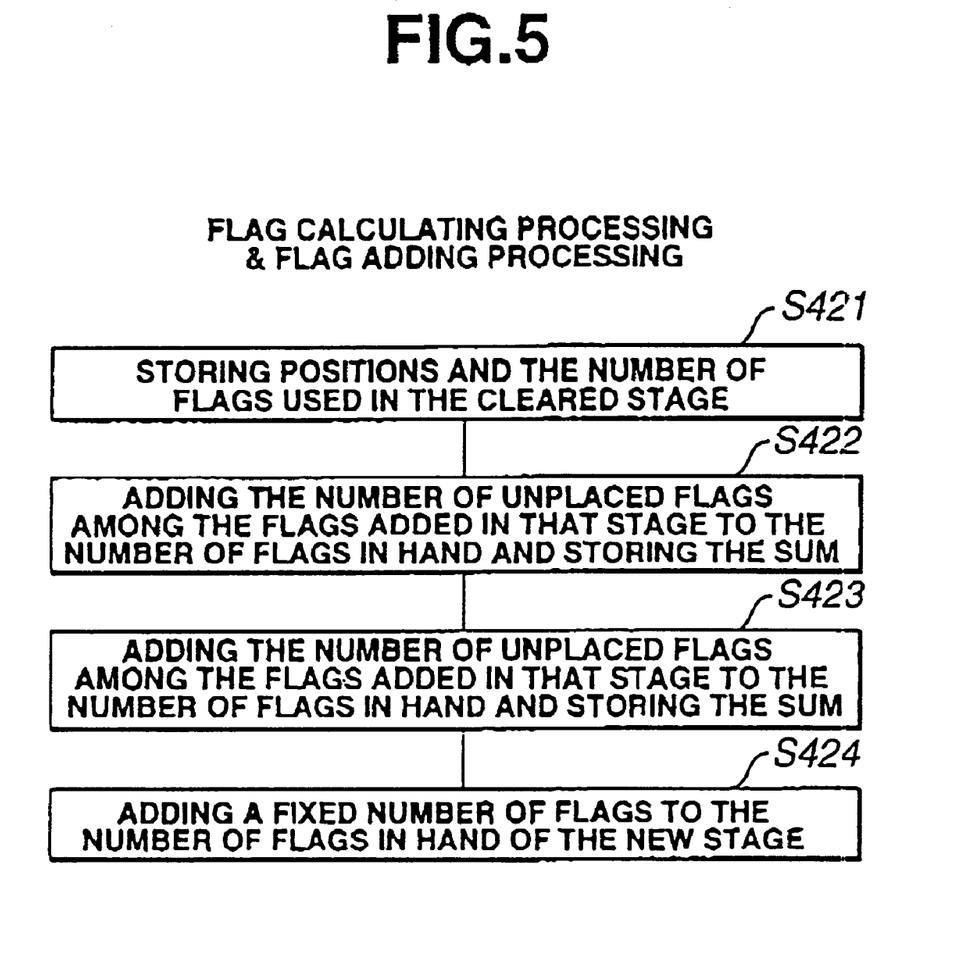
FIG. 5 is a detailed flowchart showing flag calculating processing and flag adding processing in the image processing according to embodiment 1 of the present invention.

FIG. 5 is a flowchart showing detailed processing implemented at step S42.

At step S421, the position and the number of flags used in the cleared maps are stored in the backup RAM of FIG. 3. For example, suppose that three flags F1 through F3 were placed as shown in FIG. 8. Among these flags, flags F1 and F2 were not used, that is, restart was not madefromthesepositions whenthecharacterdied. Meanwhile, flag 3 was used, and restart was made from that position. The positions, the number and the using condition of these three flags F1 through F3 will be stored.

At step 422, the number of unplaced flags out of the flags added for that map will be added to the number of flags in hand in that map, and the sum is to be thereafter stored. In other words, (the number of flags added in that map)–(the number of flags placed in that map) will be stored. For example, when four flags are added in that map, and three flags are placed, (4–3=) 1 flag is the number of flags to be stored.

At step S423, the number of unused flags out of the flags placed in that map is to be added to the number of flags in hand, and the sum is thereafter stored. In other words, (the number of flags placed in that map)–(the number of flags used) is stored. For example, as shown in FIG. 9, if three flags F1 through F3 were placed in that map, and only F3 was used out of these flags, the remaining two flags F1 and F2 will be returned as flags which may be used again.

At step S424, a fixed number of flags are added to the number of flags in hand at a new stage. Such number is predetermined in the program for each stage.

Now, an example of the above processing S421 through S424 will be shown. For example, suppose that upon entry to map X, the number of flags initially in hand was 3. If 2 is the number of the flags determined for that map, then 2 flags will be added, and the number of flags in hand as of the start of that map X will be 5. If 3 flags were placed before clearing that map, the number in hand would be reduced to 5−3=2 flags. Furthermore, suppose that 3 flags have been placed, but the character was dead only once leaving the rest of the 2 flags unused. In such case, upon clearing the stage, the remaining 3−1=2 flags are added to 2 flags, i.e., the number of flags in hand, thereby making 2+2=4 flags the number of flags in hand to be stored.

Moreover, if only 1 flag was placed and the character was dead only once, the calculation would similarly be 4 flags.

Step S43: Recording the Positions of the Flags

Positions of the flags are recorded according to the results of step S42.

Step S44: Processing for Commercing the Next Stage

Since the adding and the calculating processing are ended by steps S40 through S43 described above, processing for the next stage is to be started. The processing is returned to S10.

Either until the player clears all of the stages or until the game is over, the above processing S10 through S44 will be repeated. Furthermore, although not shown in FIG. 4, bonus points may be added on the basis of the number of flags in hand at the time the game was over. This way, not only the clearing of the stage but also the technique of making the number of the flags minimum may be competed, and the amusement of the game is increased.

As mentioned above, according to embodiment 1, flags are set in the conquered maps and the positions of the flags are stored, and therefore, it is possible to restart from any positions of the flags being stored. Furthermore, since the number of flags added for each map is limited, the storing frequency may be restricted. This brings the following effects:

(1) The players of the game widely vary in their degree of the operation proficiency, and they may feel differently regarding which part of the game is difficult. In embodiment 1, by allowing the player to freely set the restarting position, the game can be played repeatedly so that the player can improve the operating technique. The player may repeat only the part he felt difficult. Thus, degrees of difficulty matching the respective players are automatically adjusted to a certain extent.

(2) By casting limitation to the frequency of the flag use, a strategic element of how to use the flags effectively is added to the game, thereby making the game more amusing.

(3) If an action game is played according to embodiment 1 of the present invention, the proficiency of the player is clearly indexed by the number of flags remaining in the map as of the clearing of the stage. The smaller the number of the remaining flags, the more ideally was the game played with fewer errors. Accordingly, the game can be played not merely for clearing the stage but also from a new viewpoint of "how to limit the number of flag used", and an increased variation of the game is attained.

(Embodiment 2)

In embodiment 1 above, the respective stages were cleared one after another along the progress of the game. However, it is possible to challenge again a game stage which was once cleared. This is called the "flag race". If the flag race is made possible, the game may be played with an objective of increasing the flags when the player doubts the completion of the game during the progress of the game because few flags are available to him, or with an objective of clearing the stage with a minimum number of flags, or with both of the above-mentioned objectives.

The summary of the flag race is as follows: With respect to the cleared stages, information is stored concerning the number of flags used in that stage (Backup RAM 210). Therefore, by entering and clearing that stage again, flags which were unused in the stage are recovered and added to the number of flags in hand, and the sum is thereafter restored together with the using condition of the flags in that stage. In other words, if the game is restarted with all the flags already used, not even one flag will be recovered even if the stage is cleared. If the stage is cleared without restarting (i.e., not dying even once), all of the flags will be recovered upon clearing the stage. Since flags recovered can be reused, if only a small number of flags is in hand during the stage, it is possible to return to the immediately preceding stage and collect flags (i.e., to increase the flags in hand by passing through positions where the flags are placed).

Figure 10:
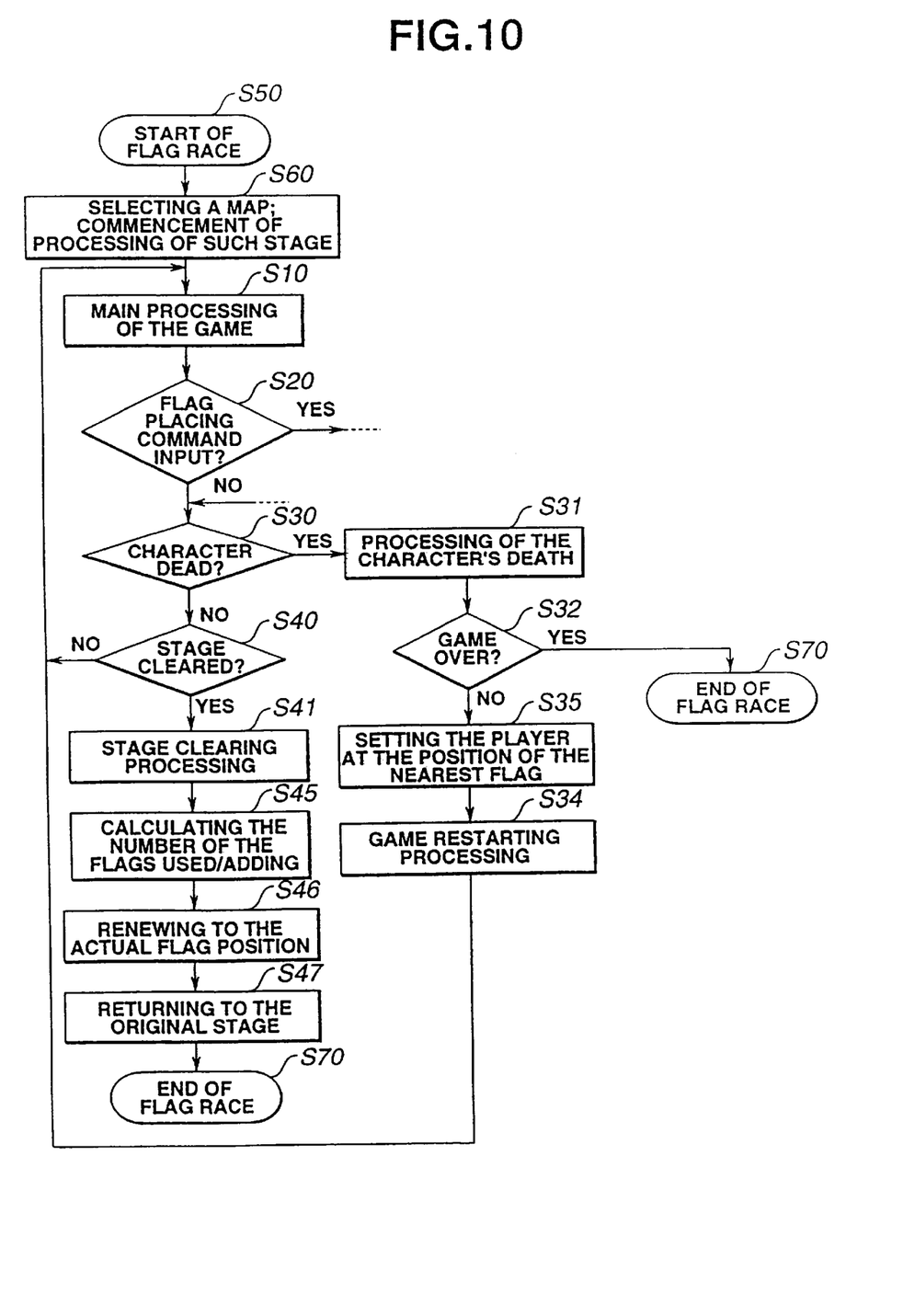
FIG. 10 is a flowchart showing image processing actions according to embodiment 2 of the present invention.

FIG. 10 is a flowchart showing the actions of the image processing device according to embodiment 2 of the present invention. In this figure, processing at S10, S20, S30, S32, S34, S40, S41 is similar to that in embodiment 1, and therefore, explanation will be omitted. S35, S45 through S47 are the processing for the flag race according to embodiment 2 of the present invention.

Next, the actions will be explained.

Step S50: Start of the Flag Race

When the player has a small number of flags in hand and wishes to increase the number of flags, a flag race will be started by selecting "flag race". Otherwise, the player sometimes may select a flag race for competing the clearing of the stage with minimum flags.

Figure 11:
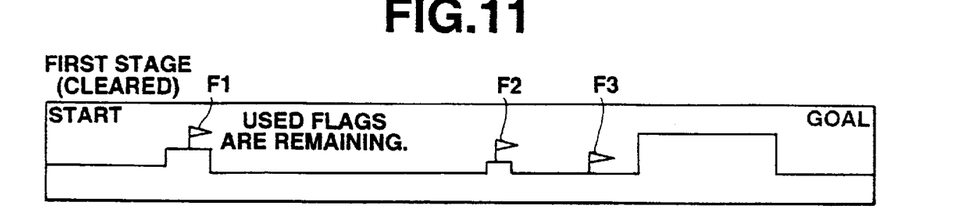
FIG. 11 is an example of a map screen explaining the image processing actions according to embodiment 2 of the present invention.
Figure 12:
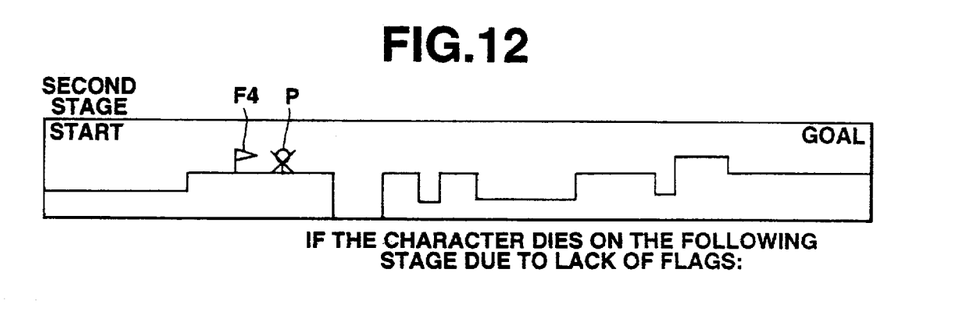
FIG. 12 is an example of a map screen explaining the image processing actions according to embodiment 2 of the present invention.

For example, in the event that the first stage is cleared with flags F1 through F3 being placed as shown in FIG. 11, but the character dies on the second stage in FIG. 12 having one flag F4 placed and thereby insufficient of flags for continuing the game, a maximum of 3 flags may be acquired by returning to the first stage.

Step S60: Selection of a Map and Commencement of Processing of the Stage

The player selects an adequate map and commences processing thereof. Although the player may select any map, the immediately preceding map will be selected if the player does not make any selection. Otherwise, it is possible to make the maps with a larger number of flags be selected in due order. For, the more the flags are placed, the more will be the flags acquired by the flag race.

Step S10: The Main Processing of the Game

Normal processing such as operation of the character or attacks from obstacles is implemented.

Step S20: Has the command for placing a flag been input?

The player can place the flags at any time, if a sufficient number of flags are in hand. A command have to input to place a flag. If such command is input (Y), processing S21 through S23 for placing the flag will be implemented. Since this processing S21 through S23 is the same as in embodiment 1, it will not be indicated in FIG. 10 and explanations will also be omitted.

If the command for placing the flag is not input (N), processing S30 is conducted.

Step S20 may be omitted. Since a flag race is a game of clearing a stage where flags have already been placed, it is deemed that there will be a relatively small necessity of newly placing a flag. Moreover, in case where minimum number of flags in a flag race is competed, there will be a relatively small necessity of newly placing a flag.

Step S30: Is the character dead?

Determination is made as to whether or not the character is damaged by attacks from obstacles existing in that map and thereby dead (i.e., a state incapable of continuing the game). If the character is dead (Y), processing S31 through S35 is implemented.

If not (N), processing S40 is implemented.

Step S31: Processing of the Character's Death

A predetermined death processing is implemented when the character is dead, and the progress of the game is temporarily ceased.

Step S32: Game over?

If the number of flags in hand which is available to the player is insufficient, the game is determined over (Y), and the processing proceeds to S70 and the flag race is ended.

If the game is not determined over (N), processing S35 is implemented.

Step S35: Setting the player at the nearest flag position

If the game can be continued, the character is displayed (set) again at the position of the nearest flag. If no flags were newly placed, the character is set either at the position of the nearest flag among the placed flags, or at the position of the nearest flag in the direction returning to the starting position. If flags were newly placed, the character will be set at the position of the flag which was last recorded. The game may be restarted from this position.

Figure 13:
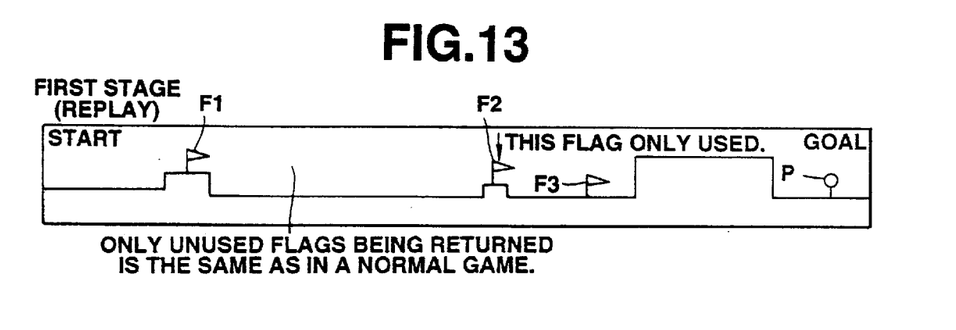
FIG. 13 is an example of a map screen explaining the image processing actions according to embodiment 2 of the present invention.

For example, when the character dies between flags F2 and F3 on the first stage in FIG. 13, the character is set at the position of flag F2.

Step S34: Game Restarting Processing

Implemented is the processing for restarting the game from the position set at step S35. Subsequently, processing is returned to S10.

Step S40: Has the stage been cleared?

If the character is not dead, determination is made as to whether or not the stage has been cleared. If the stage has been cleared (Y), processing S41 through S47 is implemented.

If not cleared (N), processing is returned to S10.

Step S41: Stage clearing Processing

When the character safely reaches the goal of that map, clearing processing of that stage is implemented.

Step S45: Calculation of the Flags Used/Addition of the Unused Flags

Flags used in that stage are calculated, and the flags unused are added to the number of flags in hand.

For example, as shown in FIG. 13, suppose that upon replaying the first stage, only flag F2 was used among the three flags F1 through F3 which were placed on that stage. In such case, 3−1=2 flags are added.

Step S46: Renewing the position of the flags

The position of the flags which existed on the stage cleared by the flag race are renewed, and the latest flag positions are stored in the backup RAM 210. For example, in FIG. 13, information concerning flag F2 is stored.

Step 47: Returning to the original stage

Return to the original stage before selecting the flag race.

Step 70: End of Flag Race

Figure 14:
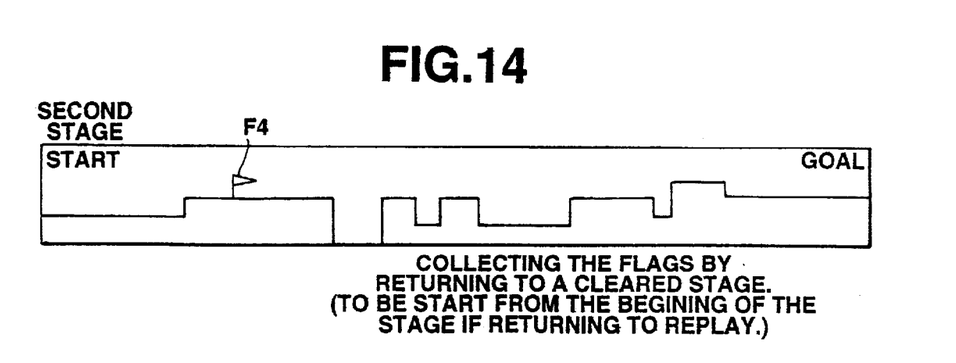
FIG. 14 is an example of a map screen explaining the image processing actions according to embodiment 2 of the present invention.
Figure 15:
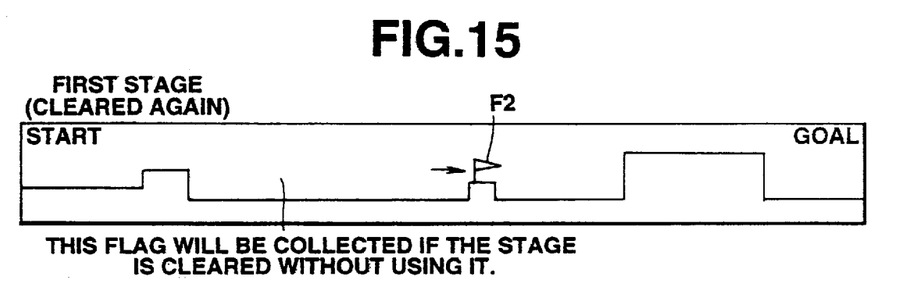
FIG. 15 is an example of a map screen explaining the image processing actions according to embodiment 2 of the present invention.
Figure 16:
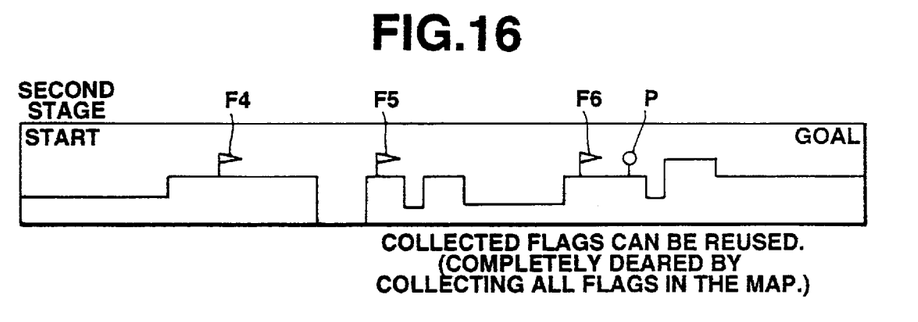
FIG. 16 is an example of a map screen explaining the image processing actions according to embodiment 2 of the present invention.

The flag race is ended. Return to, for example, the second stage of FIG. 14. Since 2 flags were obtained in the flag race on the first stage, flags F5 and F6 can be placed as shown in FIG. 16, and the player may clear the second stage. Furthermore, since there is still one flag F2 remaining on the first stage, it is possible to conduct a flag race again to collect 1 flag. Thus, all flags can be collected in principle.

Specific examples of FIG. 10 will be explained. For example, suppose there remains only 1 flag in hand and the player considers that the situation thereafter would be tough and pays attention to a stage z which had been difficult to pass. The stage Z was a difficult stage,which was barely cleared by placing as many as 5 flags. However, upon challenging again, the stage was cleared using only 2 flags because the player had become proficient in the operation.

In this case, collected were 3 (=5−2) unused flags remaining as of the clearance of the stage, and the total number of flags in hand becomes 4 (=1+3 flags). In this case, also renewed is the number of flags in hand which should be stored in this stage, and the number of flags used in this stage becomes 2.

Thus, the following effects are achieved by the flag race according to embodiment 2, wherein previously conquered stages are played again.

(1) By collecting the flags (which are placed at the stored points), the number of flags in hand is increased and the limit of the storing frequency of the flags cast for each stage is eased.

(2) The player is able to increase the storing frequency by becoming proficient in the game operation. Moreover, a structure is established with increased storing frequency permitting storage at any time based upon the player's necessity, namely, proficiency in the game operation, clearing of the stage→necessity to increase storing frequency, collection of the flags by returning to a previous stage, etc. Thus, an adequate degree of difficulty is automatically adjusted for the player up to a certain extent.

(3) Since the player is able to ease the limitation of the flag storing frequency with his own ability, the game can be played strategically. Upon playing the game again, since the storing frequency can be increased, strategies may be changed according to the player's proficiency in the game.

(4) The proficiency of the player in clearing the stage is clearly indexed by the number of the flags. That is, the smaller the number of the used flags remaining in the map as of the end of the stage, the less were the errors during the game. Therefore, it is possible to challenge one's proficiency in the game operation based upon the number of flags used for clearing the stages in the flag race. Accordingly, the game can be played not only for clearing the stage but also with a new viewpoint of "how to limit the use of flags to a minimum", whereby the game is played with more variety.

Although the present invention is explained above using "flags", the invention is not limited to cases where "flags" are used. So long as the marks are capable of displaying their positions in some way, the displaying forms thereof may be altered at one's option.

Industrial Applicability

As described above, according to the present invention, returning points upon failure of completing the game are set along the progress of the game and displayed, whereby players insufficiently skilled in the operation may also concentrate on the game without being bored.

Moreover, according to the present invention, by adding limitations to the settable returning point, the degree of difficulty of the game may be adjusted to each player without lowering the difficulty of the game in excess.

Furthermore, according to the present invention, by changing the settable returning points, the difficulty of the game operation may be altered, whereby the amusement of the game is increased.

What is claimed is:

1. An image processing device comprising:

an image processing means for generating a displaying image including a segment and for advancing respective steps of game control in sequence;

a movement control means for moving displaying positions of said segment;

a mark displaying means for displaying specific marks in said displaying image during the progress of a game, wherein said mark displaying means eliminates displayed marks already set by the instruction of the player, and displays the eliminated marks at different displaying positions; and a storing means for storing displaying positions of the displayed marks, wherein, when said segment is unable to continue moving, said movement controlling means causes said segment to move to the displaying positions of said marks and restart the movement from such displaying positions.

2. An image processing device according to claim 1, wherein said mark displaying means displays in the displaying image said marks at said displaying positions instructed from the outside.

3. An image processing device according to claim 1, wherein said mark displaying means displays said marks within the limit of a predetermined number of the marks in hand.

4. An image processing device according to claim 1, whrerein the game is structured of a plurality of stages, said mark displaying means displays said marks for each of the plurality of stages, and said of said respective marks and thereafter restarts movements of said segment when said segment is unable to continue moving for each of said plurality of stages.

5. An image processing device according to claim 4, wherein said mark displaying means renews the number of said marks in hand allotted to each stage if the progress of said stage is completed.

6. An image processing device according to claim 4, comprising a mark adding means for adding a predetermined number of marks to the number of said marks in hand and for storing added marks in said storing means when the new stage is commenced.

7. An image processing device according to claim 4, comprising a mark calculating means for implementing calculating processing, as of the end of the progress of said stage, on the basis of the number of marks in hand displayed in said stage and for storing the calculated number of marks in hand into said storing means.

8. An image processing device according to claim 7, wherein said mark calculating means adds the number of said marks displayed in said stage excluding the marks used by said movement controlling means for restarting the movement of said segment to the number of marks in hand.

9. A game device according to any one of claims 1 through 8, wherein said displaying image is a certain map and said segment is a game segment heading for its destination while avoiding obstacles by the operation of the player.

* * * * *